United States Patent Office 2,993,712
Patented July 25, 1961

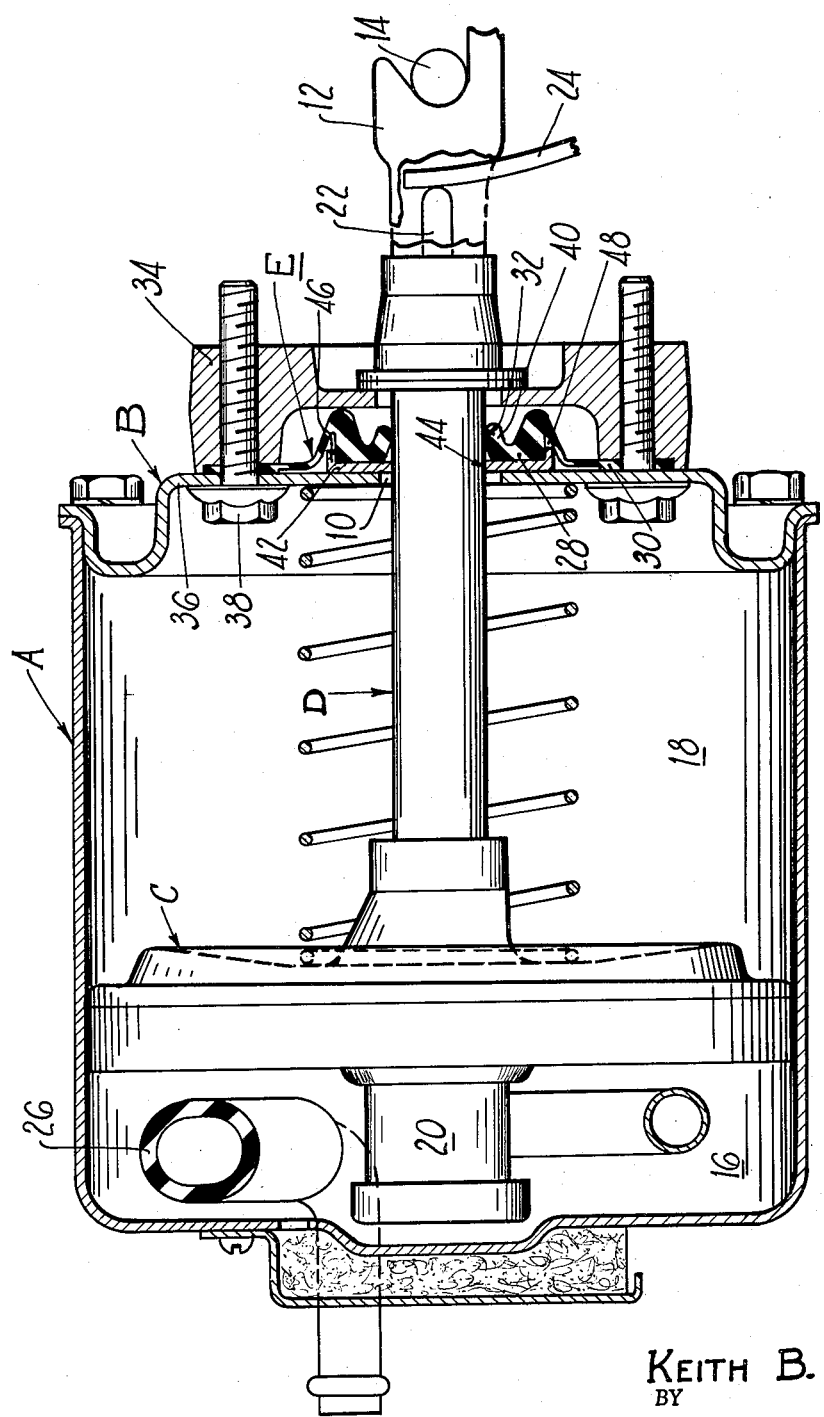

2,993,712
DIAPHRAGM SEAL FOR RECIPROCATING SHAFT
Keith B. Hocker, South Bend, Ind., assignor to The Bendix Corporation, a corporation of Delaware
Filed Oct. 29, 1958, Ser. No. 770,418
6 Claims. (Cl. 286—15)

The present invention relates to seals for fluid pressure motors and more particularly to a type of seal which will accommodate reciprocatory, lateral, and angular movement between a piston rod and the motor housing.

An object of the present invention is the provision of a new and improved sealing structure of the above described type which will accommodate three degrees of movement and which is simple in construction, inexpensive to manufacture, and reliable in its operation.

The invention resides in certain constructions, and combinations, and arrangements of parts; and further objects and advantages will become apparent to those skilled in the art to which the invention relates from the following description of the preferred embodiment described with reference to the accompanying drawing forming a part of the specification.

The solitary figure of the drawing is a cross sectional view of a fluid pressure servomotor of the type shown and described in Hupp et al. application Serial No. 559,556, filed January 17, 1956, now Patent No. 2,829,625. The fluid pressure motor shown in the drawing generally comprises a cup-shaped housing A having a removable cover plate B and in which a power piston C is located. A piston rod D driven by the power piston C projects through an opening 10 in the cover plate B, and the sealing structure E of the present invention is positioned between the piston rod D and the cover plate B for effecting a pressure seal therebetween.

As described in the above referred to application Serial No. 559,556, the outer end 12 of the piston rod D abuts a pin 14 that is carried by arcuately movable levers so that the outer end of the piston rod D moves slightly transversely to the axis of the fluid pressure motor as the piston rod D moves outwardly of the housing A. Lateral movement of the pin 14 therefore causes the piston rod D to move laterally with respect to the cover plate B, and at the same time produces a tilting or angular movement of the piston D with respect to the cover plate B. As explained in the above referred to application, the power piston C is provided with a suitable seal on its outer periphery which will maintain an effective seal with respect to the housing A during this rocking or angular movement.

As further explained in application Serial No. 559,556, the servo-motor unit is known in the power brake field as an atmospheric suspended unit in which atmospheric pressure is continually admitted to the opposing power chamber 16 on the left hand side of the power piston C, and in which, during its normal or deenergized condition, atmospheric pressure is communicated to the other opposing power chamber 18 on the right hand side of the power piston C through a control valve structure 20 that is housed within the power piston C. Operation of the control valve structure 20 is had by means of a control rod 22 which projects externally of the unit through the piston rod D, and which in turn is actuated by means of a control lever 24. When the control lever 24 is moved away from the servomotor unit, or to the right as seen in the drawing, the control valve 20 closes off atmospheric communication between the opposing power chamber 18 and the power chamber 16, and admits vacuum from a flexible vacuum supply line 26 to the other opposing power chamber 18. During actuation of the unit, therefore, atmospheric pressure will exist on the outside of the sealing structure E while vacuum is being communicated to its opposite side adjacent the opening 10 in the cover plate B. For a more complete understanding of the construction and operation of the servomotor unit shown in the drawing, reference may be had to the above referred to application Serial No. 559,556.

The sealing structure E of the present invention may generally be described as a flexible diaphragm made from a resilient material such as Buna N rubber, and which has an annular radially inner portion 28 and an annular radially outer portion 30. The surfaces of the sealing structure E shown in the drawing are surfaces of revolution so that the cross section seen in the drawing is typical for any plane passing through the axis of the piston rod D. The annular inner portion 28 is provided with a centrally located opening 32 therethrough, the sidewalls of which opening slidingly engage the piston rod D. In the preferred construction shown in the drawing, the annular inner portion 28 is of an axial thickness considerably greater than the annular outer portion 30 to provide more body and rigidity to the portion immediately surrounding the piston rod D. The sealing structure E is formed initially with a central opening 32 which is slightly smaller than the cross section of the piston rod D so that the sidewalls of the opening will normally be tensioned about and will remain into firm engagement with the surfaces of the piston rod D when the sealing structure E is assembled about the piston rod.

The thickness of the diaphragm structure may vary depending upon the pressure differential which the seal is to withstand, and in the preferred construction shown in the drawing its annular outer portion 30 is made considerably thinner than the center portion 28 so that most of the flexing which occurs during movement of the piston rod D will take place in the outer portion 30 of the seal adjacent the center portion 28. The outer periphery of the annular outer portion 30 is clamped between a retaining ring 34 and the main portion 36 of the cover plate B by means of a plurality of bolts 38 to effect a seal between the outer periphery of the structure B and the housing of the servomotor unit. Pressure differential across the sealing structure E helps to normally maintain a seal between the inner portion 28 of the diaphragm structure and the piston rod D when the piston rod is at rest. To help in this respect, the inner portion 28 of the sealing structure will preferably be provided with an annular lip 40 which is tensioned about and engages the surfaces of the piston rod D so that an additional radially inner force is created by pressure differential to help to hold the seal into the engagement with the piston rod D.

The sealing structure E is completed by a rigid cup-shaped washer 42 having a centrally located opening 44 through which the piston rod D extends and which opening 44 has only a small amount of clearance with respect to the surfaces of the piston rod D. The laterally projecting sidewalls 46 of the washer 42 are positioned in a recess 48 of the rubber diaphragm, which recess 48 divides the rubber diaphragm into its inner and outer portions 28 and 30 respectively. During actuation of the servomotor unit, lateral and angular movement of the piston rod D causes the cup-shaped washer 42 to be moved laterally along with the abutting portion of the piston rod, and the cup-shaped washer 42 thereupon carries the lateral movement to the opposite side of the piston rod to hold the annular inner portion 28 of the diaphragm into engagement with the piston rod D. The configuration of the sealing structure E may vary depending upon the application of the seal, and may, under certain conditions, be formed with the recess 48 on either side of the diaphragm, but in the preferred arrangement is positioned between the diaphragm and the portion of the housing containing the piston rod opening 10 in order that the center portion 28 of the diaphragm need not rub against a stationary surface during its lateral movement, and so that the center portion of the diaphragm 28 need only affect a seal with respect to a very slight clearance that is provided between the cup-shaped member 42 and the piston rod D, rather than the larger opening that is provided by the piston rod opening 10. It will further be understood that the sealing structure E need not always be positioned on the outside of the servomotor unit, but may also be positioned inside of the servomotor unit, particularly where the pressure within the unit is greater than atmospheric.

While the invention has been described in considerable detail, I do not wish to be limited to the particular constructions shown and described; and it is my intention to cover hereby all novel adaptations, modifications, and arrangements thereof which come within the practice of those skilled in the art to which the invention relates.

I claim:

1. In a fluid pressure motor, a housing having an end wall with an axially extending opening therethrough and across which a pressure differential is to be maintained, a generally cylindrically shaped rod projecting through said opening, a diaphragm made of flexible material and positioned adjacent one side of said end wall, said diaphragm having a center portion with an opening therethrough and through which opening said rod extends, and said opening being formed of a smaller diameter than said rod so as to be normally tensioned about said rod, said diaphragm also having an annular recess which recess surrounds said central portion of said diaphragm, means sealingly clamping the outer portion of said diaphragm member to said end wall, and a cup-shaped member movable laterally relative to said opening in said housing and having sidewalls that project into said recess of said diaphragm to confine said center portion of said diaphragm therein, and said cup-shaped member having a centrally located opening therethrough sidewalls of which slidingly engage said rod to hold said center portion in engagement with said rod, whereby an effective pressure seal is provided which will accommodate axial, lateral and angular movement of said rod.

2. In a fluid pressure motor, a housing having an end wall with an axially extending opening therethrough and across which a pressure differential is to be maintained, a generally cylindrically shaped rod projecting through said opening, a diaphragm made of flexible material and positioned adjacent one side of said end wall, said diaphragm having a center portion with an opening therethrough and through which opening said rod extends, and said opening being formed of a smaller diameter than said rod so as to be normally tensioned about said rod, said diaphragm also having an annular recess in its side adjacent said end wall of said housing which recess surrounds said central portion of said diaphragm, means sealingly clamping the outer portion of said diaphragm member to said end wall, and a cup-shaped member movable laterally relative to said opening in said housing and having sidewalls that project into said recess of said diaphragm to confine said center portion of said diaphragm therein, and said cup-shaped member having a centrally located opening therethrough sidewalls of which slidingly engage said rod to hold said center portion of said diaphragm in engagement with said rod, whereby an effective pressure seal is provided which will accommodate axial, lateral and angular movement of said rod.

3. In a fluid pressure motor, a housing having an end wall with an axially extending opening therethrough and across which a pressure differential is to be maintained, a generally cylindrically shaped rod projecting through said opening, a diaphragm made of flexible material and positioned adjacent one side of said end wall, said diaphragm having an axially thickened center portion with an opening therethrough and through which opening said rod extends, said center portion of said diaphragm having a lip surrounding said opening which projects away from said end wall, and said opening being formed of a smaller diameter than said rod so as to normally tension said lip about said rod, said diaphragm also having an annular recess which recess surrounds said center portion of said diaphragm, means sealingly clamping the outer portion of said diaphragm member to said end wall, and a cup-shaped member movable laterally relative to said opening in said housing and having sidewalls that project into said recess of said diaphragm to confine said center portion of said diaphragm therein, and said cup-shaped member having a centrally located opening therethrough sidewalls of which opening slidingly engage said rod to hold said center portion of said diaphragm in engagement with said rod, whereby an effective pressure seal is provided which will accommodate axial, lateral and angular movement of said rod.

4. In a fluid pressure motor, a housing having an end wall with an axially extending opening therethrough and across which a pressure differential is to be maintained, a generally cylindrically shaped rod projecting through said opening, a diaphragm made of flexible material and positioned adjacent one side of said end wall, said diaphragm having an axially thickened center portion with an opening therethrough and through which opening said rod extends, said center portion of said diaphragm having a lip surrounding said opening which projects away from said end wall, and said lip being formed with an opening of a smaller diameter than said rod so as to normally tension said lip about said rod, said diaphragm also having an annular recess in its side adjacent said end wall of said housing which recess surrounds said center portion of said diaphragm, means sealingly clamping the outer portion of said diaphragm member to said end wall, and a cup-shaped member movable laterally relative to said opening in said housing and positioned between said diaphragm and said end wall, said cup-shaped member having sidewalls projecting into said recess of said diaphragm to confine said center portion of said diaphragm therein, and said cup-shaped member having a centrally located opening therethrough sidewalls of which opening slidingly engage said rod to hold said center portion of said diaphragm in engagement with said rod, whereby an effective pressure seal is provided which will accommodate axial, lateral and angular movement of said rod.

5. In a fluid pressure motor, a housing having an end wall with an axially extending opening therethrough and across which a pressure differential is to be maintained, a generally cylindrically shaped rod projecting through said opening, a diaphragm made of flexible material and positioned adjacent one side of said end wall, said diaphragm having an axially thickened center portion with an opening therethrough and through which opening said rod extends, said center portion of said diaphragm having a lip surrounding said opening which projects away from said end wall, and said lip being formed with an opening of a smaller diameter than said rod so as to normally tension said lip about said rod, said diaphragm also having an annular recess in its side adjacent said end wall of said housing which recess surrounds said central portion of said diaphragm, means sealingly clamping the outer portion of said diaphragm member to said end wall, a cup-shaped member movable laterally relative to said opening in said housing and positioned between said diaphragm and said end wall, said cup-shaped member having sidewalls projecting into said recess of said diaphragm to confine said center portion of said diaphragm therein, and said cup-shaped member having a centrally located opening therethrough sidewalls of which opening slidingly engage said rod to hold said center portion of said diaphragm in engagement with said rod, and abutment means adjacent the opposite side of said center portion of said diaphragm from said end wall of said housing for limiting movement of said diaphragm away from said end wall, whereby an effective pressure seal is provided which will accommodate axial, lateral and angular movement of said rod.

6. In a fluid pressure motor, a housing having an end wall with an axially extending opening therethrough and across which a pressure differential is to be maintained, a generally cylindrically shaped rod projecting through said opening, a diaphragm made of flexible material and positioned adjacent one side of said end wall, said diaphragm having a center portion with an opening therethrough and through which opening said rod extends, and said opening being formed of a smaller diameter than said rod so as to be normally tensioned about said rod, means sealingly clamping the outer portion of said diaphragm member to said end wall, and a rigid member movable laterally relative to said opening in said housing and having a centrally located opening therein sidewalls of which opening slidingly engage said rod, and a radially outer portion of said rigid member engaging said center portion of said diaphragm to restrain lateral movement of said center portion of said diaphragm away from said red and to hold said center portion of said diaphragm in engagement with said rod, whereby an effective pressure seal is provided which will accommodate axial, lateral, and angular movement of said rod.

References Cited in the file of this patent

UNITED STATES PATENTS

| | | |
|---|---|---|
| 2,477,882 | La Brie | Aug. 2, 1949 |
| 2,859,055 | Hupp | Nov. 4, 1958 |
| 2,864,632 | Hupp | Dec. 16, 1958 |